United States Patent
Bull

[11] 3,807,655
[45] Apr. 30, 1974

[54] PNEUMATIC DELIVERY SYSTEM
[75] Inventor: Walter E. Bull, Aurora, Colo.
[73] Assignee: Powers Regulator Company, Skokie, Ill.
[22] Filed: Jan. 31, 1972
[21] Appl. No.: 222,151

[52] U.S. Cl........................ 243/25, 243/19, 243/28
[51] Int. Cl............................................. B65g 51/28
[58] Field of Search............. 243/19, 24, 25, 28, 38; 138/46

[56] References Cited
UNITED STATES PATENTS
| 669,485 | 3/1901 | Pearsall................................. 243/28 |
| 1,309,598 | 7/1919 | Pearsall................................. 243/25 |
| 873,590 | 12/1907 | Pearsall................................. 243/28 |
| 1,951,820 | 3/1934 | Emerson................................ 243/19 |
| 3,353,560 | 11/1967 | McCulloch............................ 138/46 |
| 1,900,946 | 3/1933 | Needham.............................. 243/25 |

FOREIGN PATENTS OR APPLICATIONS
1,908,766   8/1970   Germany .............................. 243/24

Primary Examiner—Evon C. Blunk
Assistant Examiner—Joseph E. Valenza

[57] ABSTRACT

A pneumatic despatching station for use in a pneumatic delivery system in which it is not desired to receive pneumatic carriers at the despatching station. The despatching station includes a flexible conduit which permits carriers to pass therethrough and may also be pushed aside to permit the insertion of a pneumatic carrier into the delivery system.

8 Claims, 7 Drawing Figures

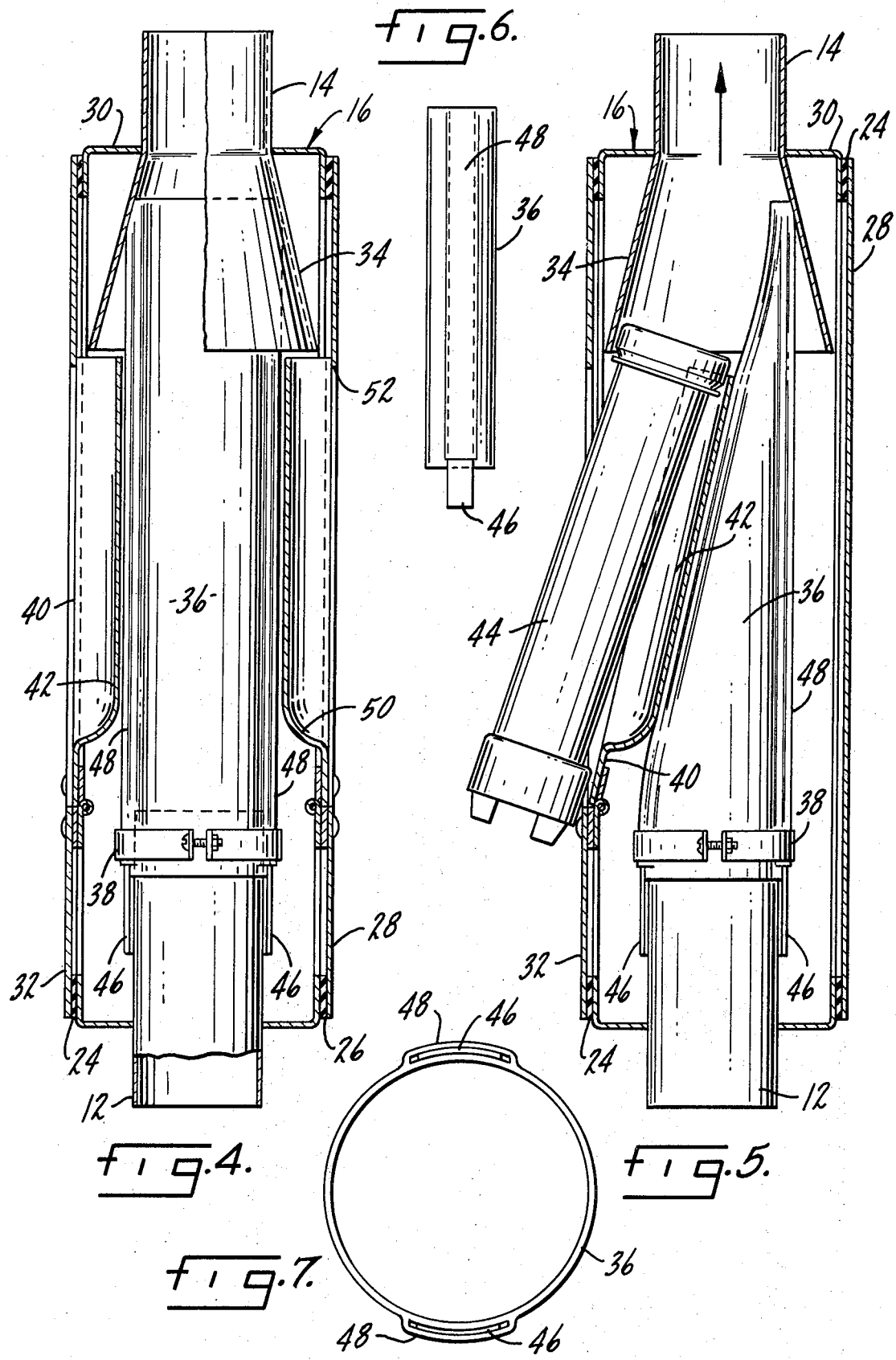

3,807,655

PNEUMATIC DELIVERY SYSTEM

BACKGROUND OF THE INVENTION

This invention relates to the field of pneumatic delivery systems. More particularly it relates to pneumatic delivery systems which include a plurality of despatching stations from which carriers are sent to a central receiving point.

A typical application for such a pneumatic delivery system is in hospitals. Preferably, a despatching station is located in each patient's room to permit transporting blood specimens and the like to a central collection point. It is not desired to receive pneumatic carriers at the despatching station in the patient's room. Prior despatching stations for use in this type of system have been bulky and have included complex mechanisms such as valves and the like.

SUMMARY OF THE INVENTION

This invention presents a despatching station for use in pneumatic delivery systems which will permit both the insertion of a carrier into the system and the passage of a carrier already in the system. It accomplishes these objectives in a minimum of space and with an extremely simple mechanism.

The despatching station includes a section of flexible or collapsible conduit which is connected to the delivery system at one end. The other end of the flexible conduit is free and nests with an appropriately configured nipple which communicates with the delivery system. For example, if the delivery conduit is cylindrical the flexible conduit is preferably cylindrical and nests with the interior of a frusto-conical nipple.

The flow of pneumatic fluid in the delivery system biases the flexible conduit in a cylindrical configuration and in its nesting relationship with the frusto-conical nipple. When a carrier is despatched, the flexible conduit is pushed aside to permit entry of the carrier into the conical nipple.

An outer housing having an access door may be included to enclose the flexible tube and preferably is vacuum sealed. The despatching station also may include an inner door to push the flexible conduit aside when the carrier is inserted.

The despatching station is capable of any orientation. It is desirable to provide conduit stiffening members to prevent the conduit from collapsing of its own weight if oriented horizontally and also to prevent a falling carrier from collapsing the conduit if oriented vertically.

BRIEF DESCRIPTION OF THE DRAWINGS

The features of this invention will become more apparent in the following description of the preferred embodiment when read in conjunction with the FIGS. in which:

FIG. 6 is a plan view of the flexible conduit illustrating a flexible supporting member, FIG. 7 is an end view of FIG. 4.

DETAILED DESCRIPTION OF THE PREFERRED EMBODIMENTS

Figure 1:
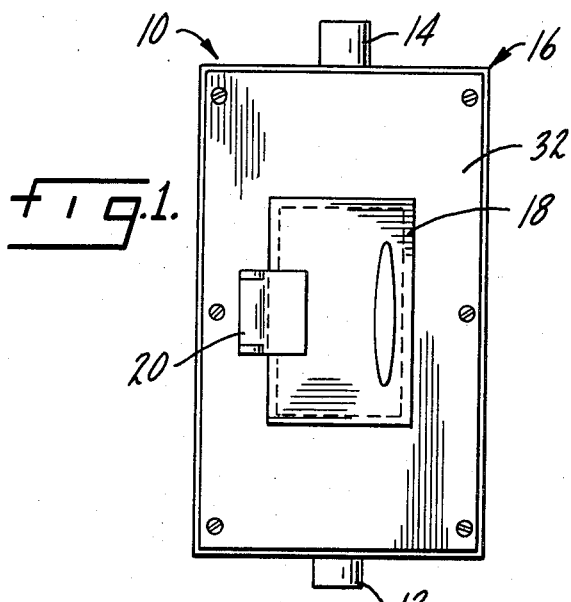
FIG. 1 is a front view of a despatching station.

Referring now to the Figures wherein like reference numerals indicate like parts, a despatching station for use in a pneumatic delivery system is illustrated at 10 in FIG. 1. The despatching station 10 includes an incoming conduit 12 and an outgoing conduit 14. Preferably, the incoming conduit 12 and the outgoing conduit 14 are nipples which are affixed to an outer housing 16. When the despatching station 10 is installed, the nipples 12, 14 are attached to the main delivery conduit (not shown). An access door 18 is hinged at 20 to permit entry into the despatching station 10.

Figure 2:
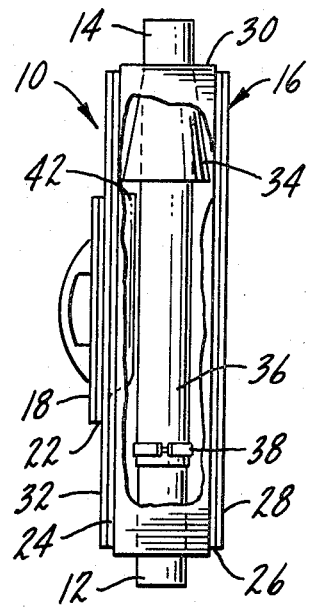
FIG. 2 is a side view of the despatching station illustrated in FIG. 1, partially cut away to illustrate the principles of this invention.

Preferably, the housing 16 and the access door 20 are vacuum sealed to prevent the loss of pressure in the delivery line. To that end, as best seen in FIG. 2, gaskets 22, 24 and 26 seal the housing 16 which is formed from a back plate 28, a rectangular medial section 30 and a front plate 32 as best seen in FIGS. 2 and 3.

The incoming nipple 12 and the outgoing nipple 14 are rigidly affixed to the medial portion 30 of the housing 16 and are spaced axially from each other. The outgoing nipple 14 includes a frusto-conical portion 34. The nipples 12, 14 communicate with each other through a flexible conduit or tube 36. The flexible conduit 36 is attached to the incoming nipple 12 by means of a clamp 38 and nests with the outgoing nipple 12 in the interior of the frusto-conical portion 34. The flexible tube 36 may be formed from polyurethane having a thickness of approximately 0.025 inches. In normal operation, the flow of pneumatic fluid through the delivery system will maintain the flexible tube 36 in position as illustrated in FIGS. 2 and 3 to permit the passage of a pneumatic carrier therethrough.

Figure 3:
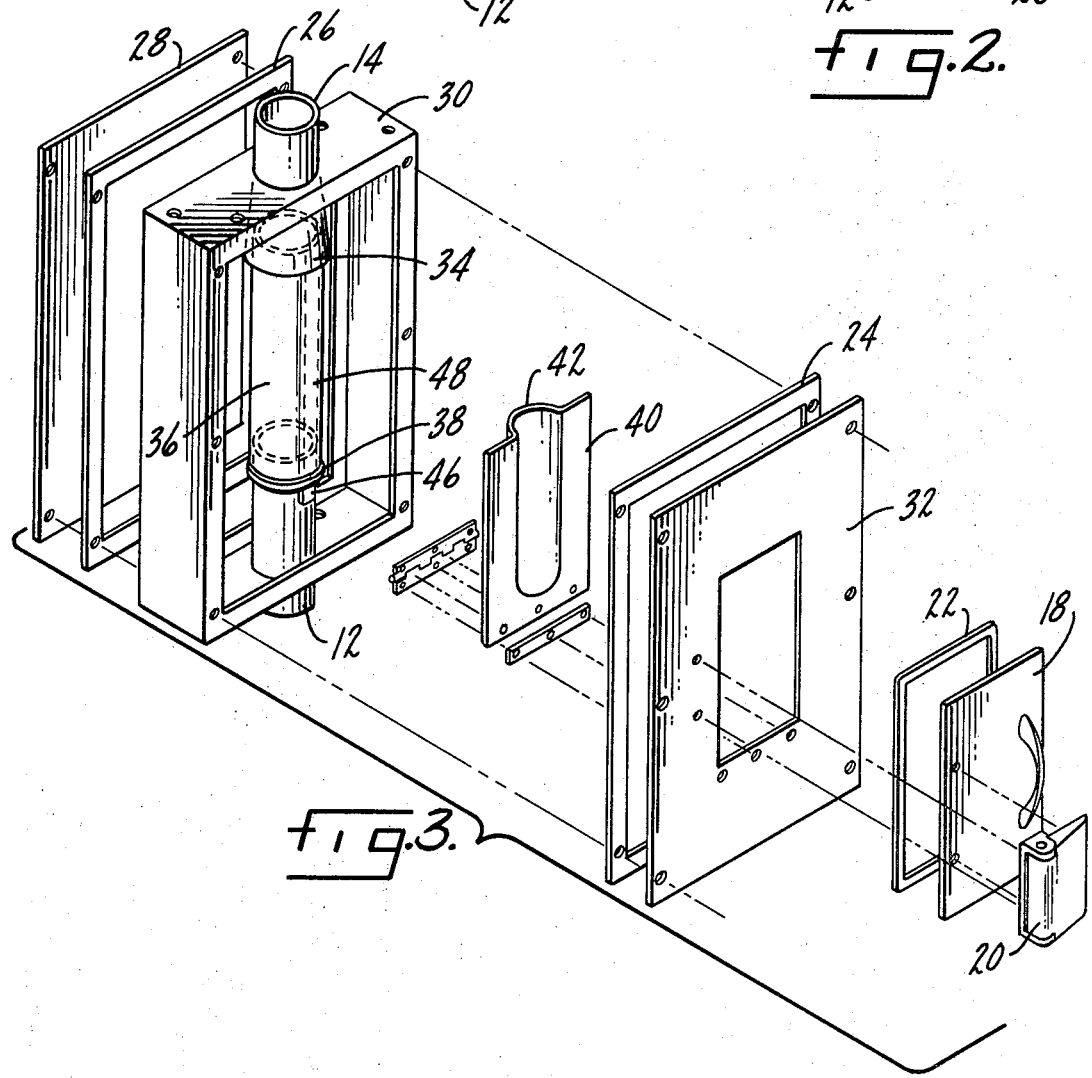
FIG. 3 is an exploded perspective view of the despatching station shown in FIGS. 1 and 2, FIGS. 4 and 5 illustrate a portion of FIG. 2 showing the operation of the flexible conduit.

Referring now to FIG. 3, an interior door 40 is hinged to the front plate 32 to permit the insertion of a carrier into the outgoing nipple 34. Means may be provided to spring bias the door 40 out of contact with the flexible tube 36. A central semi-circular depression 42 may be formed in the inner door 40 to facilitate placement of a carrier into the frusto-conical portion 34 of the outgoing nipple 14.

FIG. 4 illustrates a flexible tube 36 in its normal position. The pneumatic flow maintains the tube 36 in a cylindrical configuration and the free end of the tube 36 nests in the interior of the frusto-conical portion 34. Thus, a pneumatic carrier travelling in the delivery system would pass unimpeded through the incoming nipple 12, the flexible tube 36, and the outgoing nipple 14.

FIG. 5 illustrates the disposition of the inner door 40 and the flexible tube 36 when a pneumatic carrier 44 is being inserted into the outgoing nipple 14. The inner door 40 presses against the flexible tube 36 and collapses it to permit access to the frusto-conical portion 34. After the pneumatic carrier 44 has been placed into the outgoing nipple 14 the door 40 and the flexible tube 36 would return to the position shown in FIG. 4.

As best seen in FIGS. 6 and 7 a pair of flexible supporting members 46 are disposed in pockets 48 formed on the exterior of the flexible tube 36. The supporting members 46 rigidify the flexible tube 36 to prevent the tube from collapsing under its own weight and also to prevent it from collapsing if a pneumatic carrier drops into a vertically oriented despatching station. The supporting member 46 may be a polypropylene strip approximately 0.090 inches thick.

A further aspect of this invention is providing a despatching station which may be used by adjoining rooms. As illustrated in FIG. 4 a second inner door 50 may be provided to permit the despatching station 10 to be used from both sides. Of course, an opening 52 is necessary in plate 28 to permit the use of the second inner door 50. An access door (not shown) would also be provided.

In a typical hospital installation, a despatching station is placed in each patient's room and the delivery conduits are interconnected in a manner well known in the art for delivery to a central collection station.

What is claimed is:

1. A despatching station for a pneumatic delivery system comprising:
    incoming and outgoing conduits axially spaced from one another, and
    flexible conduit means having a fixed end and a free end and being attached to said incoming conduit at said fixed end and communicating with said outgoing conduit at said free end, whereby pneumatic carriers may pass through said flexible conduit means and said flexible conduit means may be pushed aside to permit insertion of a pneumatic carrier into said outgoing conduit.

2. The despatching station set forth in claim 1 further comprising a door to push aside said flexible conduit.

3. The despatching station set forth in claim 2 further comprising a vacuum sealed housing enclosing said door and said flexible conduit, and wherein said incoming and outgoing conduits are nipples attached to said housing.

4. The despatching station set forth in claim 3 wherein said conduits are cylindrical and said outgoing nipple includes a frusto-conical section in communication with said free end of said flexible conduit means.

5. The despatching station set forth in claim 4 further comprising at least one elongated stiffening member disposed longitudinally on said flexible conduit means.

6. A pneumatic delivery system comprising:
    a plurality of despatching stations;
    a collection station; and
    delivery conduit communicating said despatching stations with said collection station;
    each of said despatching stations comprising:
    a vacuum sealed housing having an access door;
    axially spaced incoming and outgoing conduits attached to said housing;
    a flexible conduit having a fixed end and a free end, said fixed end being attached to said incoming conduit and said free end communicating with said outgoing conduit; and
    an inner door disposed on said housing for collapsing said flexible conduit to permit insertion of a pneumatic carrier into said outgoing conduit.

7. A penumatic despatching station comprising:
    a vacuum sealed housing having an access door;
    a cylindrical incoming conduit on said housing;
    a cylindrical outgoing conduit on said housing;
    a frusto-conical member on said outgoing conduit disposed inside said housing and being axially spaced from said incoming conduit;
    a flexible cylindrical conduit having one end attached to said incoming conduit and the other end nesting in the interior of said frusto-conical member; and an inner door registered with said access door for moving said flexible conduit to permit insertion of a pneumatic carrier in said outgoing conduit.

8. The despatching station set forth in claim 7 further comprising two elongated stiffening members disposed longitudinally on said flexible conduit.

* * * * *